(12) United States Patent
Larson (10) Patent No.: US 11,029,133 B2
(45) Date of Patent: Jun. 8, 2021

(54) MOVEABLE BARRIER SYSTEM TO PROVIDE BULLET-PROOF SHELTER

(71) Applicant: Audrey Hannah Larson, Wallingford, CT (US)

(72) Inventor: Audrey Hannah Larson, Wallingford, CT (US)

( * ) Notice: Subject to any disclaimer, the term of this patent is extended or adjusted under 35 U.S.C. 154(b) by 10 days.

(21) Appl. No.: 16/269,074

(22) Filed: Feb. 6, 2019

(65) Prior Publication Data

US 2020/0248990 A1    Aug. 6, 2020

(51) Int. Cl.
*F41H 5/24*    (2006.01)
*F41H 5/04*    (2006.01)
*E04B 2/72*    (2006.01)

(52) U.S. Cl.
CPC ............ *F41H 5/24* (2013.01); *F41H 5/04* (2013.01); *B32B 2571/02* (2013.01); *E04B 2/72* (2013.01)

(58) Field of Classification Search
CPC ..... F41H 5/04; F41H 5/24; F41H 5/08; F41H 5/06; E04H 9/04
See application file for complete search history.

(56) References Cited

U.S. PATENT DOCUMENTS

| | | | |
|---|---|---|---|
| 6,568,310 B2 * | 5/2003 | Morgan | F41H 5/0457 244/118.5 |
| 10,125,486 B1 * | 11/2018 | Handley | E04H 15/48 |
| 2016/0247372 A1 | 8/2016 | Sylvester | |
| 2016/0332718 A1 * | 11/2016 | Guering | B64D 11/00 |
| 2020/0018572 A1 * | 1/2020 | Gonzales | F41H 5/226 |

FOREIGN PATENT DOCUMENTS

| | | | |
|---|---|---|---|
| CN | 2612775 Y | 4/2004 | |
| CN | 204960451 U | 1/2016 | |
| DE | 202019001614 U1 * | 7/2020 | ............ F42D 5/045 |
| EP | 0116819 A1 | 8/1984 | |

* cited by examiner

*Primary Examiner* — Reginald S Tillman, Jr.
(74) *Attorney, Agent, or Firm* — Wilmer Cutler Pickering Hale and Dorr LLP (57) ABSTRACT

A moveable barrier system comprising a first panel having a first vertical edge and a second vertical edge, the first vertical edge rotatably coupled to a first vertical surface along a first axis, and a second panel having a third vertical edge and a fourth vertical edge, the third vertical edge of the second panel rotatably coupled to the second vertical edge of the first panel, the fourth vertical edge of the second panel removably coupled to a second vertical surface. Each of the first and second panel have a structural layer that forms a vertical plane, spanning the first vertical edge and the second vertical edge, and a projectile resistant layer that is resistant to projectile impact. The first panel and the second panel are configured to move from a stored position into an active position when in use.

12 Claims, 5 Drawing Sheets

MOVEABLE BARRIER SYSTEM TO PROVIDE BULLET-PROOF SHELTER

FIELD OF THE INVENTION

The present innovations generally address moveable barrier systems. More particularly, the present innovations relate to providing bullet-proof shelter for occupants of a room or other enclosed space during emergency situations.

BACKGROUND

Recently, mass public shootings have become more prominent in the news and have occurred more frequently each year. Shopping centers, offices, and, most notably, schools, are some of the most frequently targeted locations. Such events lead to personal anxiety about going to school or other public locations and create a sense that no public location is safe, or adequately equipped to provide protection from unpredictable violence. Especially in the school classroom context, students now practice basic lockdown procedures that require hiding in closets or underneath desks. These basic lockdown procedures do not provide the capability to discourage an active shooter or adequately protect students from projectiles.

Moreover, basic lockdown procedures do not provide an immediate alert to other nearby rooms or locations that may be at risk during an emergency situation, nor do they provide an immediate alert to authorities and rescue personnel. Accordingly, a system is required that can physically protect students and others from projectiles during an active shooting or other emergency situation. A system is also required that can rapidly alert nearby locations, as well as authorities and rescue personnel, when an emergency situation is underway. A system is also required that can discourage shooters from engaging in well-protected public locations.

SUMMARY

The present disclosure is directed at systems for providing bullet-proof shelter for occupants of a room or other enclosed space during emergency situations. In some embodiments, a moveable barrier system is provided. The moveable barrier system can include a first panel having a first vertical edge and a second vertical edge, the first vertical edge rotatably coupled to a first vertical surface along a first axis, and a second panel having a third vertical edge and a fourth vertical edge, the third vertical edge of the second panel rotatably coupled to the second vertical edge of the first panel, the fourth vertical edge of the second panel removably coupled to a second vertical surface. The first panel can have a first structural layer that forms a vertical plane, spanning the first vertical edge and the second vertical edge, and can also have a first projectile resistant layer and a second projectile resistant layer, each resistant to projectile impact. The second panel can have a second structural layer that forms a vertical plane, spanning the third vertical edge and the fourth vertical edge, and can also have a third projectile resistant layer and fourth projectile resistant layer, each resistant to projectile impact.

In an exemplary embodiment, the first panel and the second panel can be configured to move from a stored position into an active position. In the stored position, both the first panel and the second panel can be positioned substantially parallel to one of the first vertical surface or the second vertical surface, and the fourth vertical edge of the second panel can be positioned along a second axis that is displaced a first distance from the first axis. In the active position, the first panel, the second panel, the first vertical surface, and the second vertical surface can enclose an area. The second panel can be coupled to the second vertical surface along a coupling axis that is displaced a second distance from the first axis, such that the second distance is greater than the first distance.

In some embodiments of a moveable barrier system, the first projectile resistant layer can have a first tensile strength value, the second projectile resistant layer can have a second tensile strength value, the third projectile resistant layer can have a third tensile strength value, and the fourth projectile resistant layer can have a fourth tensile strength value. In some embodiments, the first tensile strength value can be at least 3.5 gigapascals. In some embodiments of a moveable barrier system, the structural layer can further have a property that provides resistance to projectile impact.

The first projectile resistant layer, second projectile resistant layer, third projectile resistant layer, and fourth projectile resistant layers can be designed such that the first tensile strength value is approximately the same as the third tensile strength value and the second tensile strength value, is approximately the same as the fourth tensile strength value.

In an exemplary embodiment of a moveable barrier system, the first structural layer of the first panel can be positioned between the first projectile resistant layer and the second projectile resistant layer, and the second structural layer of the second panel can be positioned between the third projectile resistant layer and the fourth projectile resistant layer. In some embodiments of a moveable barrier system, a first internal projectile layer of the first panel and a second internal projectile layer of the first panel can be provided. The first internal projectile layer can be positioned between the first projectile resistant layer and the first structural layer, and the second internal projectile layer can be positioned between the second projectile resistant layer and the first structural layer.

In some embodiments of a moveable barrier system, a third internal projectile layer of the second panel and a fourth internal projectile layer of the second panel can also be provided. The third internal projectile layer can be positioned between the third projectile resistant layer and the second structural layer, and the fourth internal projectile layer can be positioned between the fourth projectile resistant layer and the second structural layer.

Some embodiments of a moveable barrier system can also include at least one handle disposed on the second panel. In some embodiments, a locking mechanism can be disposed on the fourth vertical edge of the second panel configured to couple to the second vertical surface when the first panel and the second panel are positioned in the active position.

In some embodiments, an indicator can be configured to signal when the first panel and the second panel are moved away from the stored position. In some embodiments, the indicator can provide a visual signal when the first panel and the second panel are moved away from the stored position. In some embodiments, the indicator can provide an aural signal when the first panel and the second panel are moved from the stored position. In some embodiments, the indicator can provide an electronic signal to at least one authorities or rescue personnel when the first panel and the second panel are moved from the stored position.

BRIEF DESCRIPTION OF THE DRAWINGS

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

DETAILED DESCRIPTION

In the following description, numerous specific details are set forth regarding the structures, systems, and methods of the disclosed subject matter and the environment in which such structures, systems, and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other structures, systems, and methods that are within the scope of the disclosed subject matter.

The disclosed structures, systems, and methods can provide physical protection to students and others from projectiles during an active shooting or other emergency situation, as well as rapidly alert nearby locations when an emergency situation is underway and discourage shooters from engaging in well-protected public locations. For example, in the school context, when an intruder enters a school building, or a lock down is otherwise called for, students will follow a lock down procedure by proceeding to a "secure" corner or other pre-designated portion of the classroom. After the students are gathered in the secure corner or other portion of the room, a teacher or other person or persons will move a moveable barrier system according to the invention from a stored position into an active position, thereby enclosing the secure portion of the classroom. The moveable barrier system will be locked into place when in the active position, securing the students and teacher(s) behind the moveable barrier system.

Figure 1:
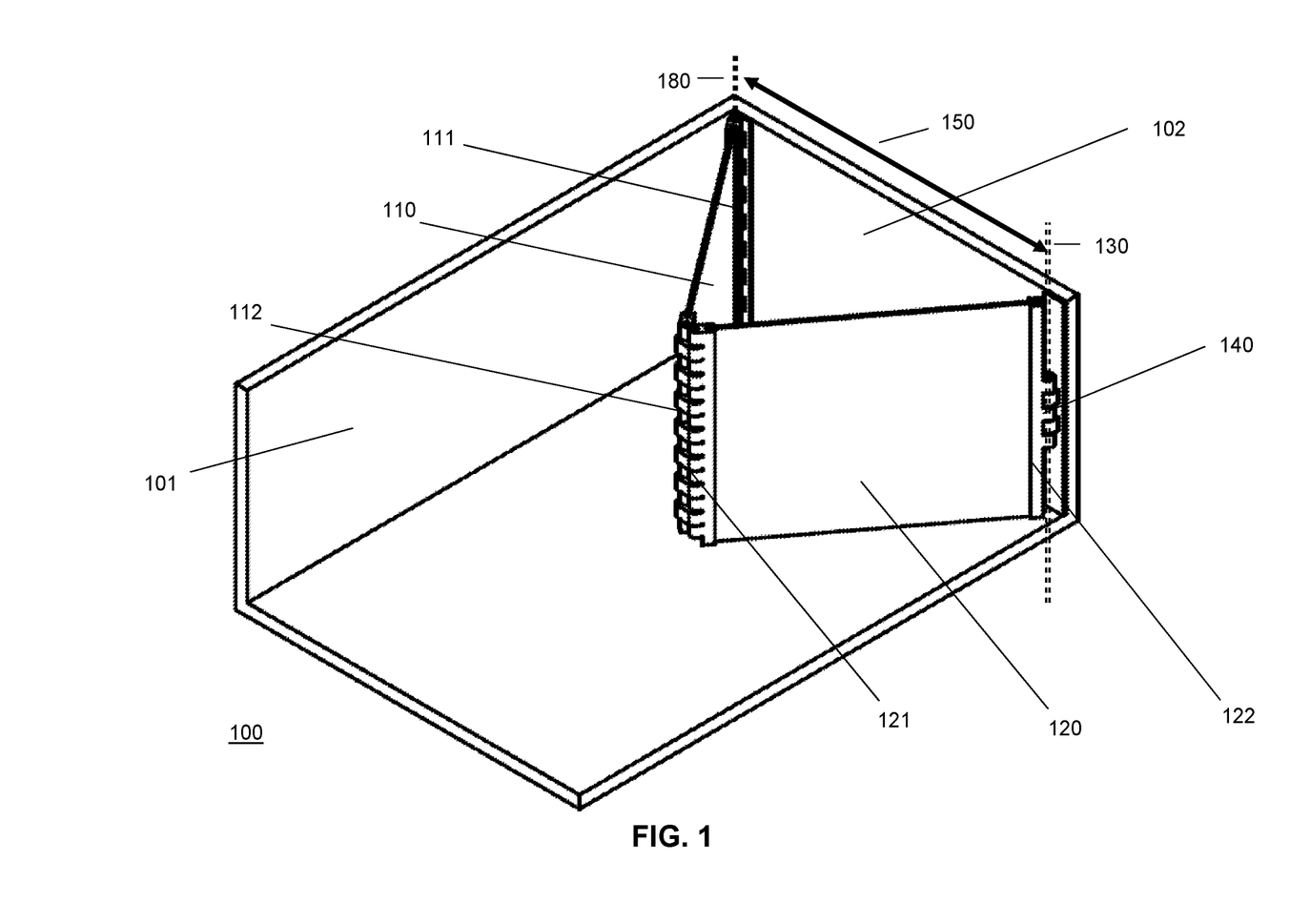
FIG. 1 shows an exemplary moveable barrier system arranged in an active position configuration, according to some embodiments.

FIG. 1 shows an exemplary moveable barrier system 100 arranged in an active position configuration, according to some embodiments. As shown in FIG. 1, the moveable barrier system 100 includes a first panel 110 and a second panel 120. The first panel 110 includes a first vertical edge 111 at one end of its horizontal dimension and a second vertical edge 112 at the opposite end of its horizontal dimension. Similarly, the second panel 120 includes a third vertical edge 121 at one end of its horizontal width and a fourth vertical edge 122 at the opposite end of its horizontal width. In the example shown in FIG. 1, the first panel 110 and the second panel 120 are both rectangular in shape and approximately equally sized in vertical height and horizontal width. While the example moveable barrier system shown in FIG. 1 includes two panels—the first panel 110 and the second panel 120—it will be appreciated that additional panels may be included in the moveable barrier system 100 to accommodate design and environmental considerations such as the size of the room, the dimensions of the secure corner or portion of the room, and the like. It will also be appreciated that the shape and size of each panel making up the moveable barrier system 100 can be adapted to accommodate design and environmental considerations such as the size of the room, the dimensions of the secure corner or portion of the room, and the like. In some embodiments, the vertical height of each panel will be substantially the same as the height of the room to provide complete coverage of the entire vertical dimension.

As shown in FIG. 1, the first vertical edge 111 of the first panel 110 is connected to a first vertical surface 101. Typically, the first vertical surface 101 is a wall in a room in which the moveable barrier system 100 is installed; however, first vertical surface 101 can be any other desirable vertical surface to which the first panel 110 may be connected. The first vertical edge 111 is rotatably coupled to the first vertical surface 101 along a first axis 180. Rotatable coupling can be made by, for example, a hinge mechanism. The third vertical edge 121 of the second panel 120 is rotatably coupled to the second vertical edge 112 of the first panel 110, preferably so that no open spaces exist between the second vertical edge 112 and the third vertical edge 121. Finally, in the active position configuration, the fourth vertical edge 122 of the second panel 120 is removably coupled to a second vertical surface 102 at an active coupling axis 130.

The second panel 120 is removably coupled to the second vertical surface 102 at the active coupling axis 130 via a locking mechanism 140. The locking mechanism 140 is configured to communicate with an indicator panel 400, later described with respect to FIG. 5. The locking mechanism 140 interfaces with the fourth vertical edge 122 of the second panel 120 via, for example, a vertical hinge or coupling mechanism. In embodiments where locking mechanism 140 interfaces with a vertical hinge, a user can physically couple the locking mechanism 140 with the vertical hinge using, for example, a bar or rod that fits into locking mechanism 140 and the vertical hinge. In other embodiments, locking mechanism 140 can comprise any other mechanical or electro-mechanical device that can secure the second panel 120 to the second vertical surface 102, as will be appreciated by those having ordinary skill in the art.

Typically, the second vertical surface 102 is a different wall than that of the first vertical surface 101, but also in the room or other enclosed space in which the moveable barrier system 100 is installed. However, the second vertical surface 102 can be any other desirable vertical surface to which the second panel 120 may be connected. In some embodiments, the second vertical surface 102 may exist in substantially the same vertical plane as the first vertical surface 101 (e.g., when the first vertical surface 101 and the second vertical surface 102 are different portions of the same wall). The separation of the first axis 180 and the active coupling axis 130 defines a first separation distance 150. Therefore, the first separation distance 150 may account for a horizontal dimension along either the first vertical surface 101, the second vertical surface 102, or a combination thereof.

Figure 2:
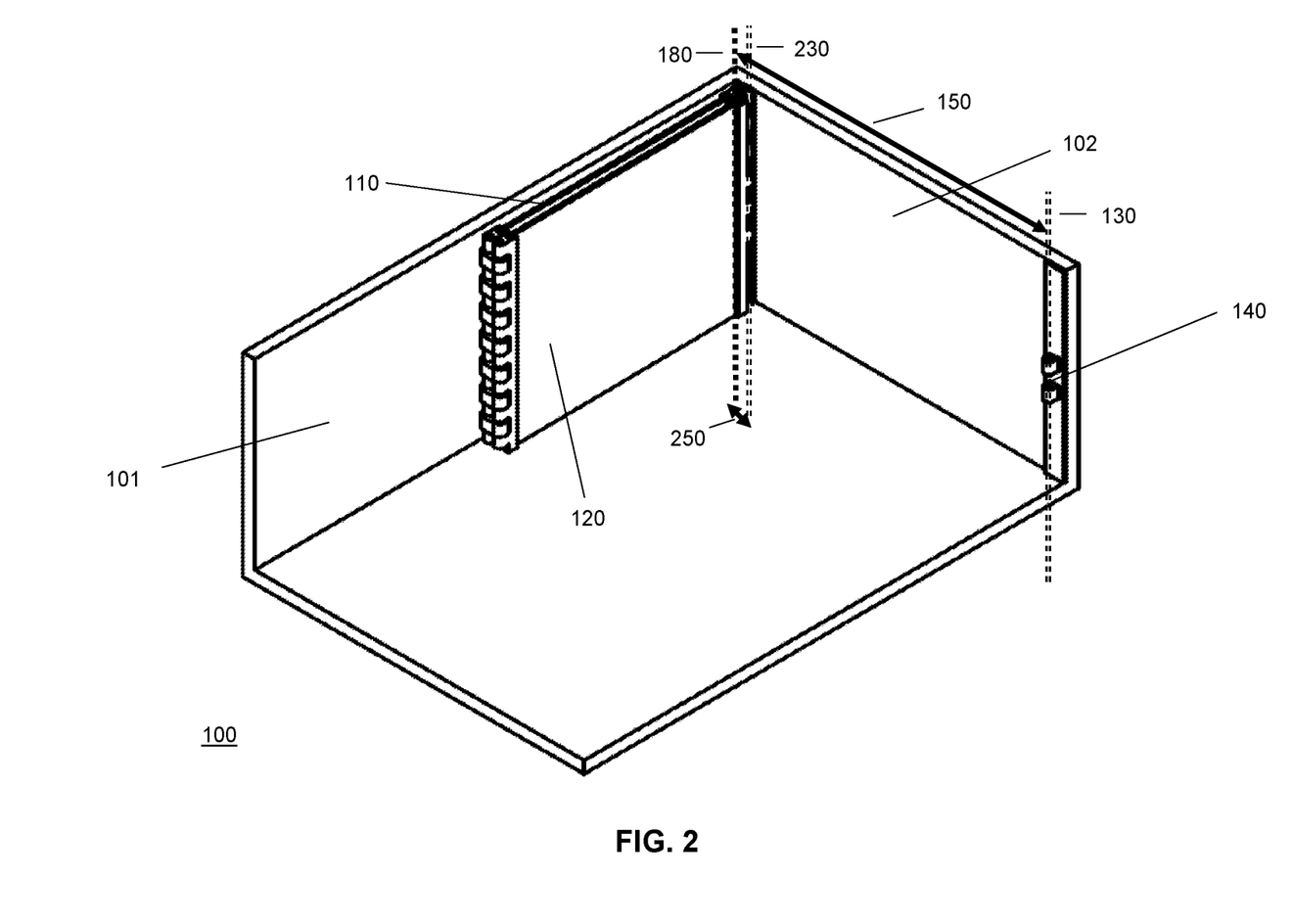
FIG. 2 shows an exemplary moveable barrier system arranged in a stored position configuration, according to some embodiments.

FIG. 2 shows the movable barrier system 100 of FIG. 1 in a stored position configuration, according to some embodiments. In the stored position configuration, the first panel 110 and the second panel 120 are substantially parallel to either the first or second vertical surface 101, 102 such that a stored coupling axis 230 is at a second separation distance 250 from the first axis 180. The second separation distance 250 is substantially smaller than the first separation distance 150. Similar to that of the first separation distance 150, the second separation distance 250 may be along a horizontal dimension of either the first vertical surface 101, the second vertical surface 102, or a combination thereof. In one embodiment, the locking mechanism 140 remains coupled to the second vertical surface 102 at a set position (e.g., aligned with axis 130) while the movable barrier system 100 is in the stored position.

The movable barrier system 100 may transition between the stored position configuration and the active position configuration when a user articulates the first panel 110 and the second panel 120. To aid in the user's transitioning, the first and second panels 110, 120 may include a sliding means (not shown) at either horizontal edge of the vertical dimension of the first and second panels 110, 120. Such sliding means may include attached caster wheels; caster wheels within the first and second panels 110, 120; attached low friction sliding material; attached furniture sliders; attached hanging track wheels; embedded hanging track wheels; or any other low-friction moving mechanisms. In order to further effectuate ease of use, the second panel 120 may include a handle (not shown) coupled to the second panel 120 that a user may push, pull, or otherwise manipulate to move the moveable barrier system 100 between both of the active position configuration and the stored position configuration.

Figure 3:
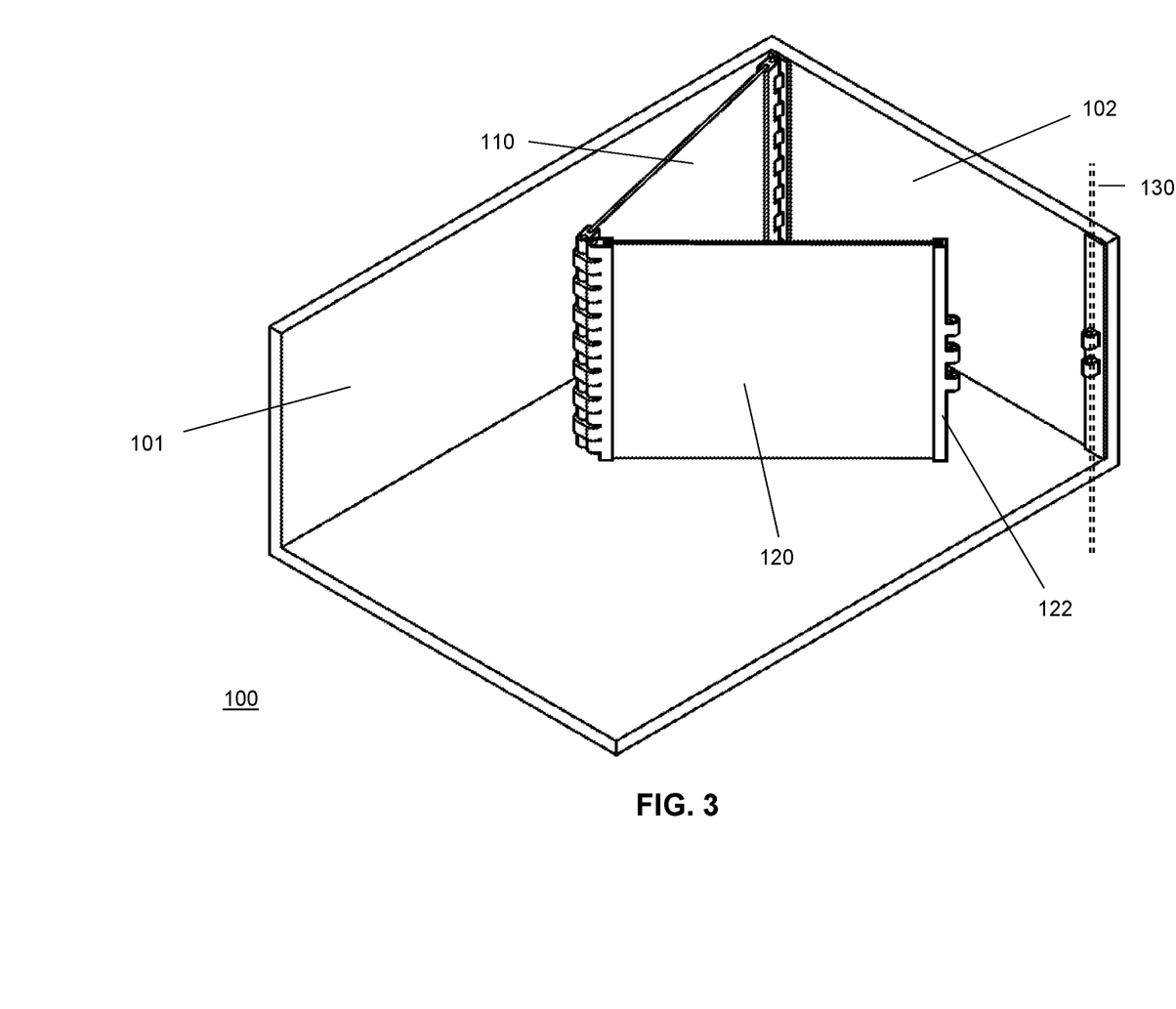
FIG. 3 shows an exemplary moveable barrier system arranged in an accessible position configuration, according to some embodiments.
Figure 5:
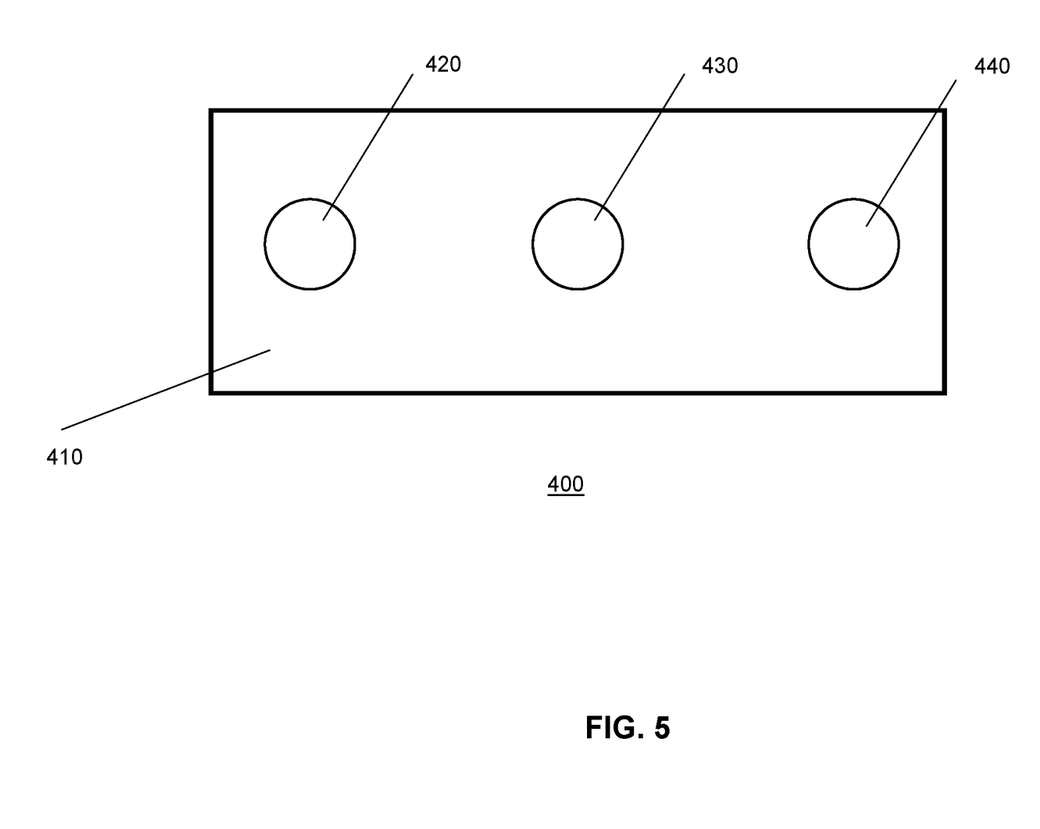
FIG. 5 shows an indicator panel, according to some embodiments.

FIG. 3 shows the moveable barrier system 100 arranged in an accessible position configuration, according to some embodiments. The accessible position represents a transition between the stored position illustrated in FIG. 2 and the active position illustrated in FIG. 1. In the accessible position, fourth vertical edge 122 of the second panel 120 is substantially separated from vertical surface 102 such that a user, or multiple users, may occupy a formed space between first panel 110, second panel 120, and second vertical surface 102. In one embodiment, the accessible position allows a user, or users, to employ the moveable barrier system 100 by moving first and second panel 110, 120 from the stored position, illustrated in FIG. 2, by pulling the fourth vertical edge 122 away from first vertical surface 101. A user, or users, may then enter the formed space created by moveable barrier system 100 in the accessible position before coupling the fourth vertical edge 122 of the second panel 120 to second vertical surface 102 at the active coupling axis 130 as shown in FIG. 1. Indicator panel 400, described later with respect to FIG. 5, is attached to second vertical surface 102 such that a user within the formed space may access indicator panel 400 when the moveable barrier system 100 is in the active position. In some embodiments, indicator panel 400 maybe be positioned outside of the formed space.

Figure 4:
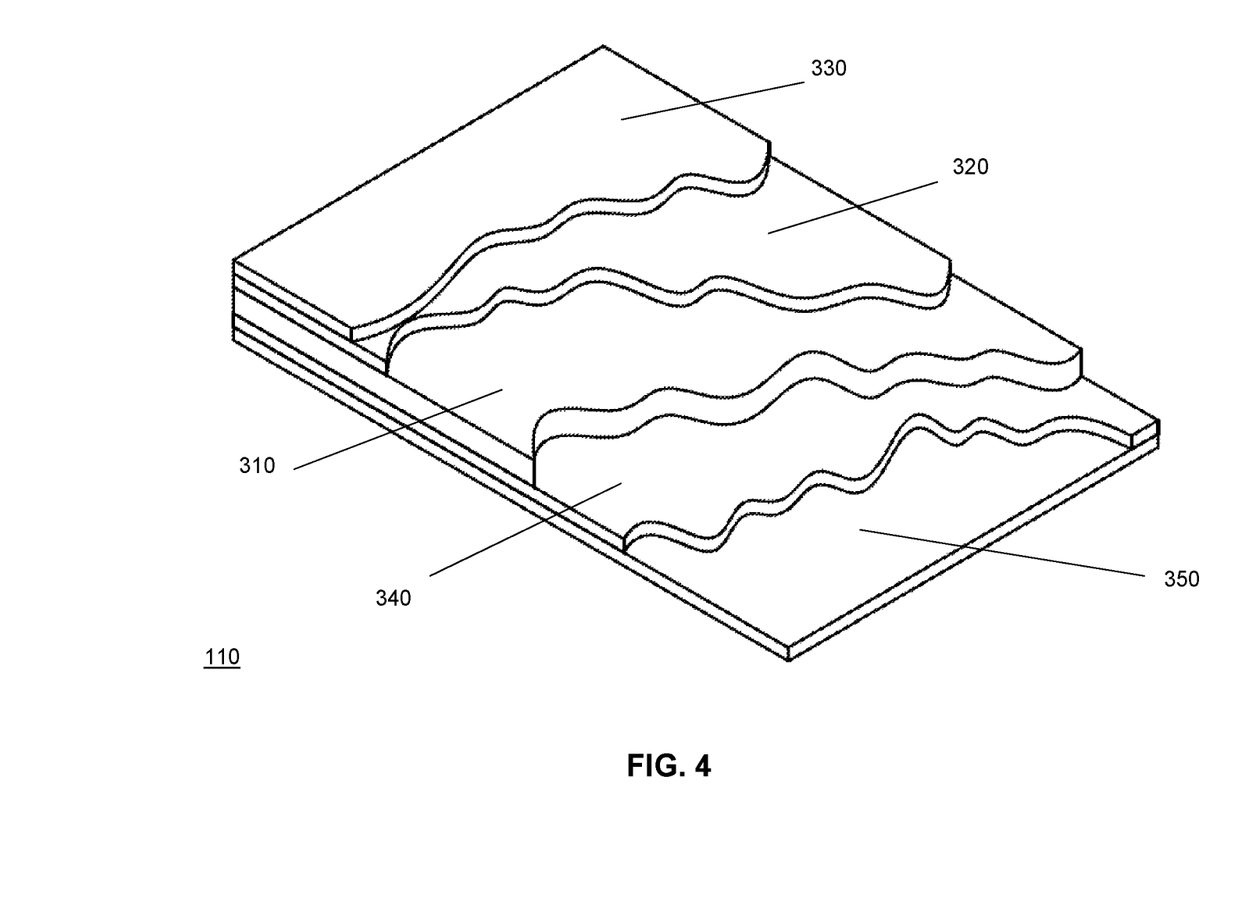
FIG. 4 shows a cross-sectional view of multiple layers of a panel, according to some embodiments.

FIG. 4 shows the specific components of a first panel 110. The second panel 120 (as well as additional panels that may be added to the system) may be constructed similarly to the first panel 110. Descriptions herein of the construction of the first panel 110 therefore describe embodiments of the second panel 120 (and other panels) as well. In one embodiment, the first panel 110 is made up of a structural layer 310, a first internal projectile layer 320, a first projectile resistant layer 330, a second internal projectile layer 340, and a second projectile resistant layer 350. The structural layer 310 is between the first internal projectile layer 320 and the second internal projectile layer 340 such that the substantial surface area of the structural layer 310 is covered on either side by the first and second internal projectile layers 320, 340. The first internal projectile layer 320 is aligned between the first projectile resistant layer 330 and the structural layer 310 such that it is substantially parallel to each of the first projectile resistant layer 330 and the structural layer 310. In this way, structural layer 310, first internal projectile layer 320, and first projectile resistant layer 330 together form three abutting layers of first panel 110. Similarly, the second internal projectile layer 340 is between the second projectile resistant layer 350 and the structural layer 310.

Other embodiments may include less or more of the above described layers within the first panel 110 as desired. It will be appreciated that additional configurations of the layers within the first panel 110, beyond those described in the one embodiment above, may be included in the moveable barrier system 100 to accommodate design and construction considerations. The use of multiple layers insures the structural integrity of each of the first and second panels 110, 120 to withstand multiple projectile impacts. Moreover, the number of layers provides for increased security against higher velocity projectiles that may otherwise breach a fewer number of layers or thinner individual layers. It will be appreciated by those of skill in the art that fewer layers may be desirable to accommodate manufacturing or use constraints. In some embodiments, fewer layers may be used when comprising materials with higher tensile strength value or thicker layer composition. Additionally, using multiple layers allows for cost-efficient production of each panel by including higher cost materials in smaller quantities while still providing sufficient total protection against projectiles.

The structural layer 310 may be made of a number of materials including stainless steel, AR500 steel, different species of woods, or other materials that provide substantial structural integrity to the panel composition. Structural layer 310 may also be made of a number of materials with a tensile strength to withstand the impact of a projectile. The first projectile resistant layer 330 may be made of a material with sufficient tensile strength to withstand the impact of a projectile. In one embodiment, the first projectile resistant layer 330 may be made using a material with a tensile strength value of at least 3.5 gigapascals. Such materials may include, Kevlar sheets, carbon fiber matting, carbon nanotubes, stainless steel, AR500 steel, or certain types of woods, among others. The second projectile resistant layer 350 may also be made of a material with sufficient tensile strength to withstand the impact of a projectile and may be made of materials substantially similar to those used for the first projectile resistant layer 330. As such, the second projectile resistant layer 350 may have substantially the same tensile strength value as the first projectile resistant layer 330. It will be appreciated by those of ordinary skill in the art that the materials comprising the structural layer 310, first projectile resistant layer 330, and second projectile resistant layer 350 may be made of materials other than those of the examples disclosed herein. Other such materials include those that can be produced in a form that is substantially a sheet and maintain a tensile strength sufficient to withstand the impact of a projectile.

The first internal projectile layer 320 may be made of a material with sufficient tensile strength to withstand projectile impact. Such materials may include those used to form the first and second projectile resistant layers 330, 350. The second internal projectile layer 340 may have substantially the same tensile strength as that of the first internal projectile layer 320. Each of the first and second internal projectile layers 320, 340, the first and second projectile resistant layers 330, 350, and the structural layer 310 may be sufficiently affixed to one another such that the first panel 110 represents a single manufactured unit.

In one embodiment, the structural layer 310 provides a rigid framework that insures the structural integrity and longevity of the first and second panels 110, 120 to retain their shape and avoid any warping or sagging over time. The first and second projectile resistant layers 330, 350 serve to dampen the impact, redirect the path of travel, and/or stop the movement of an incoming projectile. The first and second internal projectile layers 320, 340 serve to dampen the impact, redirect the path of travel, and/or stop the movement of the incoming projectile or an incident projectile or projectiles should the first and second projectile resistant layers 330, 350 fail to entirely stop or redirect the incoming projectile. In this way, the first and second projectile resistant layers 330, 350 serve as insurance for the structural integrity of the structural layer 310 by preventing any puncturing that can form gaps or anomalies in surface of the structural layer 310.

FIG. 5 shows an indicator panel 400 according to some embodiments. The indicator panel 400 includes an indicator panel face 410, an emergency call indicator 420, a remote activation indicator 430, and a local activation indicator 440. The indicator panel 400 may be located coplanar with the second vertical surface 102 within the first separation distance 150 of FIG. 1 such that a user may access the indicator panel 400 while within the movable barrier system 100 in the active position configuration. In some embodiments, the indicator panel 400 may operate a standby and active mode, the transition of which occurs when the locking mechanism 140 is coupled to the second vertical surface 102, and the first panel 110 and the second panel 120 are in the active position represented in FIG. 1.

The indicator panel 400 active mode allows for connection to at least one remote location that receives the data from the indicator panel 400. Such remote locations may include, among others, a school administrative office, other classrooms or public spaces within a school, a police dispatch center, or outdoor recreation spaces. In one embodiment, the removal of the moveable barrier system 100 from the stored position triggers into active mode the emergency call indicator 420, the remote activation indicator 430, and the local activation indicator 440. In one embodiment, the emergency call indicator 420 illuminates to indicate that the moveable barrier system 100 has called authorities and/or rescue personnel, such as by dialing 911, in response to being removed from the stored position. In other embodiments, the emergency call indicator 420 is capable of illuminating to indicate that telephonic contact has been made with any of the at least one remote locations by, for example, telephone, intercom, local area network (LAN), or other wireless communication methods.

The remote activation indicator 430 may illuminate when the moveable barrier system 100 in, for example, another classroom of a school has been moved from the stored position by a user. The remote activation indicator 430 may also indicate activation in another classroom by emitting an aural signal in the form of a siren or bell in place of, or in combination with, the illuminated signal. The local activation indicator 440 may illuminate to indicate that the moveable barrier system 100 has been deployed by a user by removing the moveable barrier system 100 from the stored position and towards the active position configuration. For example, the local activation indicator 440 can illuminate in the color green to indicate that the locking mechanism 140 is securely engaged as confirmation for the user. In one embodiment, when the local activation indicator 440 illuminates, a remote activation indicator as part of indicator panels in other locations employing a moveable barrier system can illuminate as well to alert users in the remote locations.

First and second panels 110 and 120 may be connected to each other at second vertical edge 112 and third vertical edge 121, and also to the first and second vertical surfaces 101 and 102 at first and second vertical edges 111 and 122 via hinges in a conventional manner as would be understood by a person of ordinary skill in the art. Preferably, the hinges permit a tight coupling that minimizes any open space between the first and second panels 110 and 120 at second and third vertical edges 112 and 121, similarly minimizes any open space between first vertical edge 111 of first panel 110 and the first vertical surface 101, and similarly minimizes any open space between fourth vertical edge 122 of second panel 120 and the second vertical surface 102. As would be appreciated by those of ordinary skill in the art, coupling of one panel to another panel, or coupling of one panel to a vertical surface, may also be achieved by any mechanism suitable to both accomplish the coupling arrangements described and allow the described system to transition into and between each of its active and stored positions.

Various other modifications, including additions and removals, can be made to the exemplary embodiments discussed without departing from the scope of the present disclosure. For example, while the embodiments described above refer to particular features, components, or particular steps, the scope of this disclosure also includes embodiments having different combinations of features, components, or steps, and embodiments that do not include all of the above described features, components, or steps.

It is to be understood that the disclosed subject matter is not limited in its application to the details of construction and to the arrangements of the components set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting.

The invention claimed is:

1. A moveable barrier system comprising:
a first panel having a first vertical edge and a second vertical edge, the first vertical edge rotatably coupled to a first portion of a perimeter of a room along a first axis, the perimeter of the room formed by one or more walls and defining a first area; and
a second panel having a third vertical edge and a fourth vertical edge, the third vertical edge of the second panel rotatably coupled to the second vertical edge of the first panel, the fourth vertical edge of the second panel removably coupled to a second portion of the perimeter of the room;
the first panel having:
a first structural layer that forms a vertical plane, spanning the first vertical edge and the second vertical edge,
a first projectile resistant layer that is resistant to projectile impact, and a second projectile resistant layer that is resistant to projectile impact; and the second panel having:
a second structural layer that forms a vertical plane, spanning the third vertical edge and the fourth vertical edge,
a third projectile resistant layer that is resistant to projectile impact, and
a fourth projectile resistant layer that is resistant to projectile impact the first panel and the second panel configured to move from a stored position into an active position, wherein, in the stored position, both the first panel and the second panel are positioned substantially parallel to and overlayed with a third portion of the perimeter of the room, the fourth vertical edge of the second panel is positioned along a second axis that is displaced a first distance from the first axis, and in the active position, the first panel, the second panel, and a fourth portion of the perimeter of the room completely enclose a second area created between the first panel, the second panel, and the fourth portion of the perimeter of the room, the second area being within the first area, wherein the first panel and the second panel form an angle of less than 180 degrees, the second panel is coupled to the second portion of the perimeter of the room along a coupling axis that is displaced a second distance from the first axis, such that the second distance is greater than the first distance, and the second area is defined such that an entire group of people within the first area can move into the second area as the first panel and the second panel move from the stored position into the active position and the entire group of people can remain completely enclosed in the second area while the panels are in the active position.

2. The moveable barrier system of claim 1 wherein the first structural layer of the first panel is positioned between the first projectile resistant layer and the second projectile resistant layer, and the second structural layer of the second panel is positioned between the third projectile resistant layer and the fourth projectile resistant layer.

3. The moveable barrier system of claim 1 wherein the first structural layer and the second structural layer further has a property that provides resistance to projectile impact.

4. The moveable barrier system of claim 1 wherein the first projectile resistant layer has a first tensile strength value, the second projectile resistant layer has a second tensile strength value, the third projectile resistant layer has a third tensile strength value, and the fourth projectile resistant layer has a fourth tensile strength value, such that the first tensile strength value is approximately the same as the third tensile strength value and the second tensile strength value is approximately the same as the fourth tensile strength value.

5. The moveable barrier system of claim 4 wherein the first tensile strength value is at least 3.5 gigapascals.

6. The moveable barrier system of claim 2 further comprising:
a first internal projectile layer of the first panel and a second internal projectile layer of the first panel, the first internal projectile layer positioned between the first projectile layer and the first structural layer, the second internal projectile layer positioned between the second projectile resistant layer and the first structural layer, and
a third internal projectile layer of the second panel and a fourth internal projectile layer of the second panel, the third internal projectile layer positioned between the third projectile resistant layer and the second structural layer, the fourth internal projectile layer positioned between the fourth projectile resistant layer and the second structural layer.

7. The moveable barrier system of claim 6 further comprising at least one handle disposed on the second panel.

8. The moveable barrier system of claim 6 further comprising a locking mechanism disposed on the fourth vertical edge of the second panel configured to couple to the second vertical surface when the first panel and the second panel are positioned in the active position.

9. The moveable barrier system of claim 8 further comprising an indicator configured to signal when the first panel and the second panel are moved away from the stored position.

10. The moveable barrier system of claim 9 wherein the indicator provides a visual signal when the first panel and the second panel are moved away from the stored position.

11. The moveable barrier system of claim 9 wherein the indicator provides an aural signal when the first panel and the second panel are moved away from the stored position.

12. The moveable barrier system of claim 9 wherein the indicator provides an electronic signal to at least one of authorities or rescue personnel when the first panel and the second panel are moved away from the stored position.

* * * * *